United States Patent
Volz

(10) Patent No.: US 6,550,971 B1
(45) Date of Patent: Apr. 22, 2003

(54) ECCENTRIC SYSTEM

(75) Inventor: Peter Volz, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/720,496

(22) PCT Filed: May 28, 1999

(86) PCT No.: PCT/EP99/03707

§ 371 (c)(1),
(2), (4) Date: Mar. 29, 2001

(87) PCT Pub. No.: WO99/67533

PCT Pub. Date: Dec. 29, 1999

(30) Foreign Application Priority Data

Jun. 22, 1998 (DE) .......................... 198 27 653

(51) Int. Cl.$^7$ ............................... F16C 19/50
(52) U.S. Cl. ................ 384/447; 384/255; 384/569
(58) Field of Search ............... 384/447, 255, 384/296, 569, 625, 492; 303/116.4

(56) References Cited

U.S. PATENT DOCUMENTS

| | | | | | |
|---|---|---|---|---|---|
| 2,676,074 A | * | 4/1954 | Nusbaum | .................... | 308/212 |
| 5,230,275 A | * | 7/1993 | Hodge et al. | .................. | 92/68 |
| 5,348,382 A | * | 9/1994 | Ebaugh et al. | ........... | 303/116.4 |
| 5,385,413 A | * | 1/1995 | Murphy et al. | .............. | 384/564 |
| 5,573,386 A | * | 11/1996 | Schmitt et al. | ............. | 417/521 |
| 5,577,846 A | * | 11/1996 | Takahashi et al. | .......... | 384/492 |
| 5,785,430 A | * | 7/1998 | Bright et al. | ................ | 384/447 |
| 6,158,326 A | * | 12/2000 | Burgdorf et al. | ............... | 92/72 |
| 6,202,538 B1 | * | 3/2001 | Scharinger et al. | ............ | 92/72 |
| 6,220,760 B1 | * | 4/2001 | Ruoff et al. | ................. | 384/447 |
| 6,240,826 B1 | * | 6/2001 | Zernickel et al. | .............. | 92/72 |

FOREIGN PATENT DOCUMENTS

| | | |
|---|---|---|
| DE | 14 53 475 | 2/1969 |
| DE | 38 21 124 | 1/1989 |
| DE | 89 10 325 | 8/1990 |
| DE | 195 06 796 | 10/1995 |
| DE | 196 25 686 | 1/1998 |
| DE | 196 48 319 | 1/1998 |
| DE | 196 32 167 | 2/1998 |
| DE | 196 36 508 | 3/1998 |
| DE | 197 20 615 | 6/1998 |
| DE | 197 04 752 | 8/1998 |
| DE | 197 11 557 | 9/1998 |
| EP | 0 325 680 | 8/1989 |
| EP | 0 539 849 | 5/1993 |

* cited by examiner

*Primary Examiner*—Jack Lavinder
*Assistant Examiner*—Bradley King
(74) *Attorney, Agent, or Firm*—Rader, Fishman & Grauer PLLC

(57) ABSTRACT

The present invention relates to a radial piston pump which is equipped with at least one operating piston, the said operating piston being driven by a shaft, wherein the shaft on its output end is provided with an eccentric ring accommodating a roller bearing, the bearing bushing of which encompasses the roll bodies and the eccentric ring. The design of the bearing bushing of the eccentric bearing ensures that motion of the eccentric bearing in an axial direction is prevented.

8 Claims, 1 Drawing Sheet

ECCENTRIC SYSTEM

TECHNICAL FIELD

The present invention generally relates to fluid pumps and more particularly relates to pump shaft assemblies using eccentric elements.

BACKGROUND OF THE INVENTION

Eccentric arrangements of this type are used in many ways for the conversion of rotary motions in linear motions, and they are especially well suited for the employment in radial piston pumps. DE 196 36 508 A1 discloses an eccentric arrangement which is used in a radial piston pump for the delivery of brake fluid in controlled automotive vehicle brake systems. The principal operation of pumps of this type involves that an electromotively driven eccentric shaft drives at least two pistons moving in opposite directions by way of the eccentric. To prevent the eccentric shaft from dragging on the drive-side ends of the pistons, a radial bearing is mounted on the eccentric of the drive shaft which follows the radial movements of the eccentric, but is stationary with respect to the drive-side ends of the piston. The radial bearing is designed with a bearing bushing that is open on either side in an axial direction or embraces the eccentric pin on one side, with the result that the radial bearing fixed to the eccentric in the eccentric arrangement described above is secured axially in one direction only, or is not secured at all.

DE 196 32 167 also describes an eccentric arrangement, wherein a radial bearing slipped onto an eccentric ring is also fixed only axially in one direction. Due to vibrations caused in the pumping operation there is the risk that the bearings displace from their position.

An object of the present invention is to configure an eccentric arrangement so that axial displacement is encountered to a minimum extent only, or is prevented at all.

The invention of the eccentric arrangement generally includes designing the bearing bushing of the radial bearing, that is arranged at the eccentric ring, as a cage in such a way that the radially directed lateral walls of the bearing bushing embrace the end surfaces of the eccentric ring. It is a basic advantage of the present invention that the degree of axial freedom of motion of the bearing is limited to a necessary minimum. This is achieved in that the inside surfaces of the radially directed lateral walls of the eccentric bearing may move into abutment on the end surfaces of the eccentric ring in both axial directions. This safeguards that free displacement of the eccentric bearing is prevented.

In a preferred embodiments, it is advisable to reduce the friction between the end surfaces of the eccentric ring and the inside surfaces of the radially oriented lateral walls of the bearing bushing. When the inside surfaces of the radially oriented lateral walls of the bearing bushing are configured as abutment surfaces, friction may be reduced considerably. To this end, the present invention proposes providing the abutment surfaces with a smooth surface by grinding or coating them. As a coating, plastic material or a hard, smooth metal layer may advantageously be used. For a further reduction of friction, favorably, the end surfaces of the eccentric ring can be designed like the abutment surfaces of the bearing bushings.

DETAILED DESCRIPTION OF THE PREFERRED EMBODIMENTS

Figure 1:
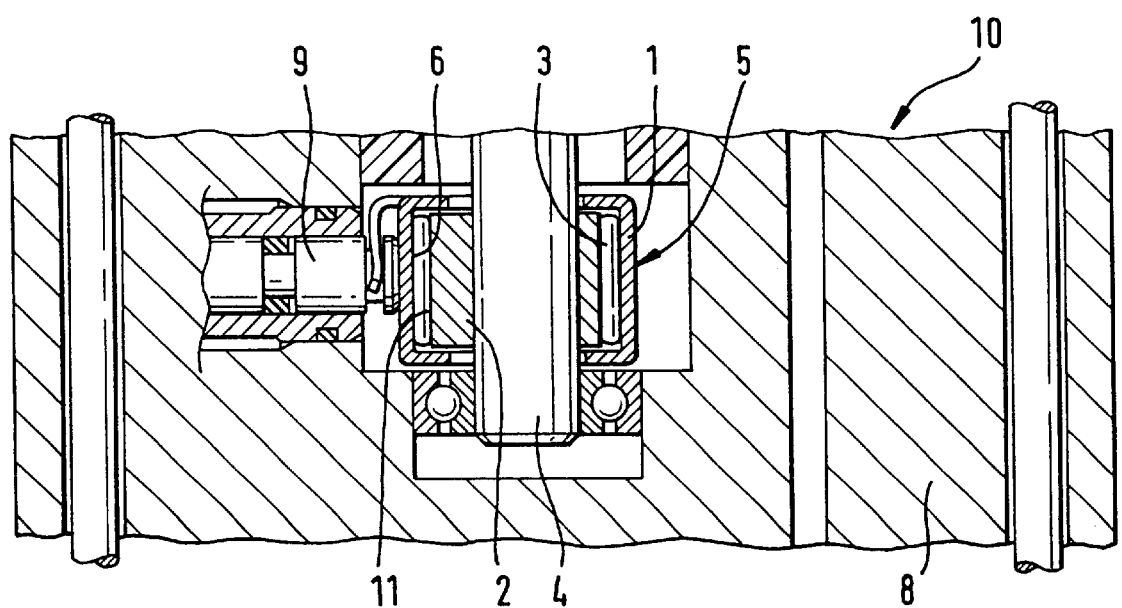
FIG. 1 is a cross-section taken through a radial piston pump in which a design variation of the eccentric arrangement of the present invention is used.

The embodiment of FIG. 1 shows a radial piston pump 10 which is equipped with one or more operating pistons 9, one of which is shown as an example. The operating pistons are guided in a pump housing 8 and driven by an eccentric. The eccentric is comprised of an eccentric ring 2 which is fitted on a shaft 4 and unrotatably connected therewith. Arranged on eccentric ring 2 is an eccentric bearing 5 which is composed of a bearing bushing 1 and several roll bodies 3. The drive-side ends of the operating pistons 9 abut on the bearing bushing 1 of the eccentric bearing 5. During operation of the pump, no relative movement is produced between the operating pistons 9 and the bearing bushing 1. The stroke of the operating pistons is produced by means of the eccentric which converts the rotary motion of the shaft 4 into a linear motion. To ensure the immobile position of the bearing bushing 1, the roll bodies 3 roll between the running surface 6 of the bearing bushing and the circumferential surface 11 of the eccentric ring 2 during the rotary motion of the eccentric.

Figure 2:
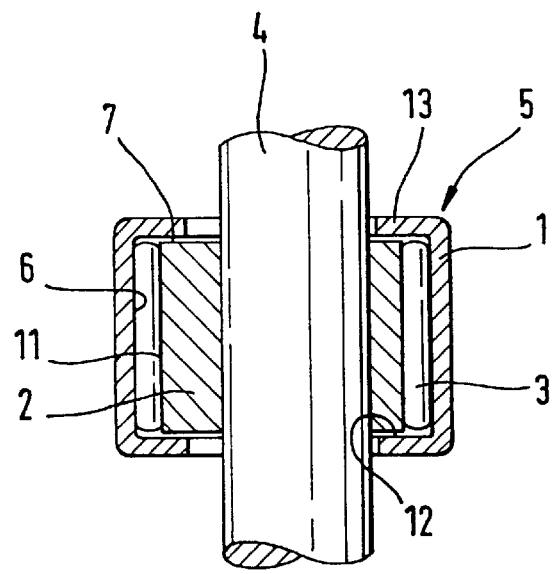
FIG. 2 is a detail view of a design variation of the eccentric arrangement according to the present invention.

The construction of the eccentric arrangement with an eccentric bearing 5 is shown in detail in FIG. 2. To transmit the rotary motion of the shaft 4 to the eccentric, the eccentric ring 2 is unrotatably fixed onto the shaft 4. To safeguard the protection against torsion, the eccentric ring 2 can e.g. be press fit or shrunk to the shaft 4. The eccentric bearing 5 is mounted on the eccentric ring 2 in the shape of a needle bearing. The bearing bushing 1 is configured as a cage so that it embraces the roll bodies 3 and the first and second end surfaces of the eccentric ring 2. The inside surfaces 12 of the radially oriented lateral walls 13 of the bearing bushing 1 are designed as abutment surfaces. To minimize friction, these abutment surfaces are coated with a plastic material or a solid metal layer. The fact that the bearing bushing 1 is designed as a cage which encompasses the eccentric ring 2 prevents the axial motion of the eccentric bearing 5.

As a second friction partner of the surfaces which the pair of abutment surfaces is comprised of, the end surface 7 of the eccentric ring 2 can be treated with the same provisions as described with respect to bearing bushing 1 in order to minimize the friction.

The use of the eccentric arrangement according to the present invention is not limited to radial piston pumps. The bearing may be employed in all cases of application where the objective is to prevent axial motion of the bearing and a relative movement to a stationary wall. The advantage involved with the radial bearing of the present invention is the fact that it obviates the need for an inner ring for the bearing, with the result of relatively small dimensions of the bearing in a radial direction being achieved. Another advantage of the bearing is that shafts which are initially equipped with the bearing can be inserted axially into bearing openings because the bearing is able to accommodate axial tangential forces as well.

I claim:

1. A shaft assembly, comprising:

a shaft, an eccentric bearing arranged on the shaft, a bearing bushing with lateral walls extending radially to the shaft, an eccentric ring disposed between the shaft and the bearing bushing, wherein the eccentric ring includes a circumferential surface that extends axially to the shaft and first and second end surfaces designed radially to the shaft, wherein the lateral walls of the bearing bushing embrace the first and second end surfaces of the eccentric ring.

2. A shaft assembly as claimed in claim 1, wherein the eccentric bearing is configured as a roller bearing or a friction bearing.

3. A shaft assembly as claimed in claim 2, wherein the eccentric bearing is configured as a roller bearing with roll bodies, wherein the bearing bushing is designed as a cage which encompasses both the roll bodies vertically to their running surface and the first and second end surfaces of the eccentric ring.

4. A shaft assembly as claimed in claim 2, wherein inside surfaces of the lateral walls of the bearing bushing are designed as abutment surfaces.

5. A shaft assembly as claimed in claim 4, wherein the abutment surfaces are hardened and ground.

6. A shaft assembly as claimed in claim 4, wherein the abutment surfaces have a low-friction design.

7. A shaft assembly as claimed in claim 4, wherein the abutment surfaces are coated with a plastic material.

8. A shaft assembly as claimed in claim 2, further including a piston coupled to said bearing brushing, wherein said piston resides within a pump housing which is coupled to an electronically controlled brake system for automotive vehicles.

* * * * *